United States Patent [19]
Hillerich et al.

[11] Patent Number: 5,694,046
[45] Date of Patent: Dec. 2, 1997

[54] METHOD AND APPARATUS FOR MONITORING THERMAL PROCESSING OF A WORKPIECE IN ACCORDANCE WITH A MEASURED CAPACITANCE FREQUENCY DISTRIBUTION

[75] Inventors: Bernd Hillerich, Ulm; Manfred Jagiella, Gaggenau, both of Germany

[73] Assignee: Precitec GmbH, Rotenfels, Germany

[21] Appl. No.: 563,007

[22] Filed: Nov. 27, 1995

[30] Foreign Application Priority Data

Nov. 28, 1994 [DE] Germany .................. 44 42 238.5

[51] Int. Cl.$^6$ .................. G01R 27/26; B23K 26/00
[52] U.S. Cl. .................. 324/681; 324/662; 324/667; 219/124.02; 340/584; 374/184
[58] Field of Search .................. 324/658, 661–663, 324/681, 685, 667–669; 340/584; 374/100, 163, 184; 219/121.6, 121.62, 121.78, 124.02

[56] References Cited

U.S. PATENT DOCUMENTS

| | | | |
|---|---|---|---|
| 3,864,626 | 2/1975 | MacLean et al. | 324/663 |
| 4,682,004 | 7/1987 | Schmall | 219/124.02 |
| 4,769,594 | 9/1988 | Darius et al. | 324/681 X |
| 4,950,084 | 8/1990 | Bailleul et al. | 374/184 X |
| 5,101,165 | 3/1992 | Rickards | 324/662 |
| 5,218,311 | 6/1993 | Jagiella et al. | 324/683 |
| 5,340,962 | 8/1994 | Schmidt et al. | 219/121.78 |

FOREIGN PATENT DOCUMENTS 4217292  5/1992  Germany.

OTHER PUBLICATIONS

W. Gatzweiler, et al. "Messung von Plasmadichtefluktuation. . ."; Laser und Optoelektronick 20 (5); (1988), pp. 64–69, month unavailable.

L. LI, et al. "Laser Weld Quality. . ."; International Conf.; (Nov. 1990), pp. 1–14.

A. Topkaya, et al. "Height Sensor Offers. . ."; Industrial Laser Review (Nov. 1983), pp. 17–18.

*Primary Examiner*—Ernest F. Karlsen
*Assistant Examiner*—Diep Do
*Attorney, Agent, or Firm*—Birch, Stewart, Kolasch & Birch, LLP

[57] ABSTRACT

A method and apparatus for monitoring thermal processing of a workpiece using a sensor electrode which can be positioned relative to the workpiece and to which an alternating electric signal is applied in order to determine a measured capacitance ($C_{meas}$) present between the sensor electrode and workpiece by evaluating a change in the alternating signal as a consequence of the measured capacitance ($C_{meas}$). A measured capacitance frequency distribution is formed from a number of determined measured capacitances ($C_{meas}$). The measured distribution is compared with a reference distribution. If a deviation is present between the two distributions, process parameters can be appropriately readjusted. It is preferable to use a laser beam for processing the workpiece.

20 Claims, 4 Drawing Sheets

LASER OUTPUT

CAPACITANCE [nf] / DESIRED VALUE

TIME (SEC)

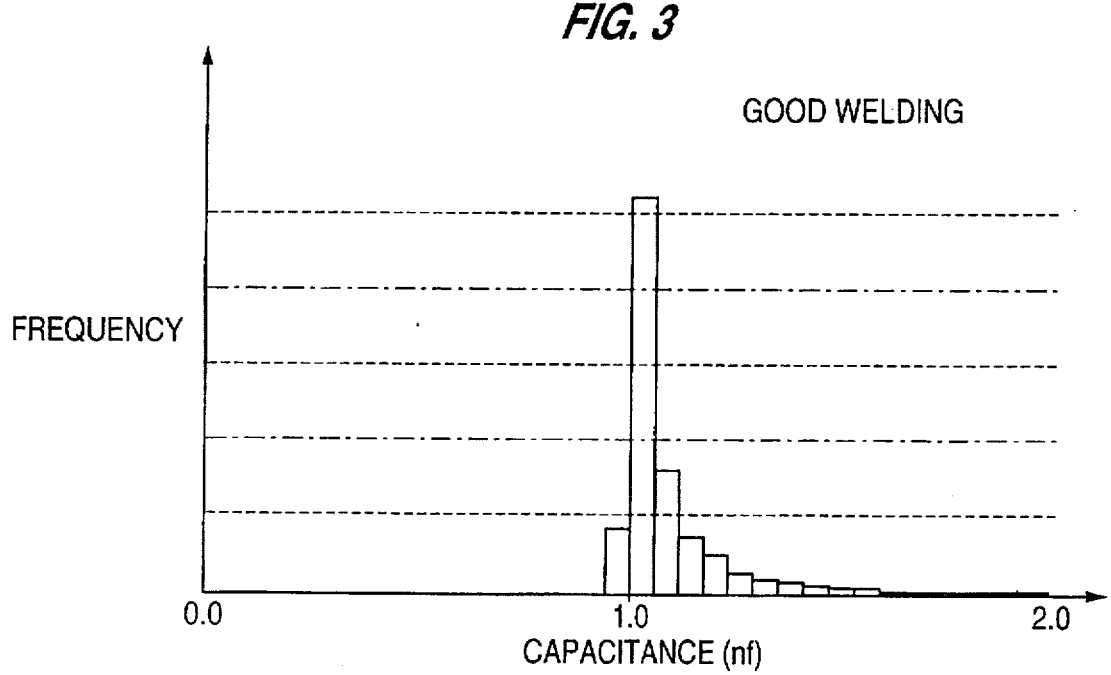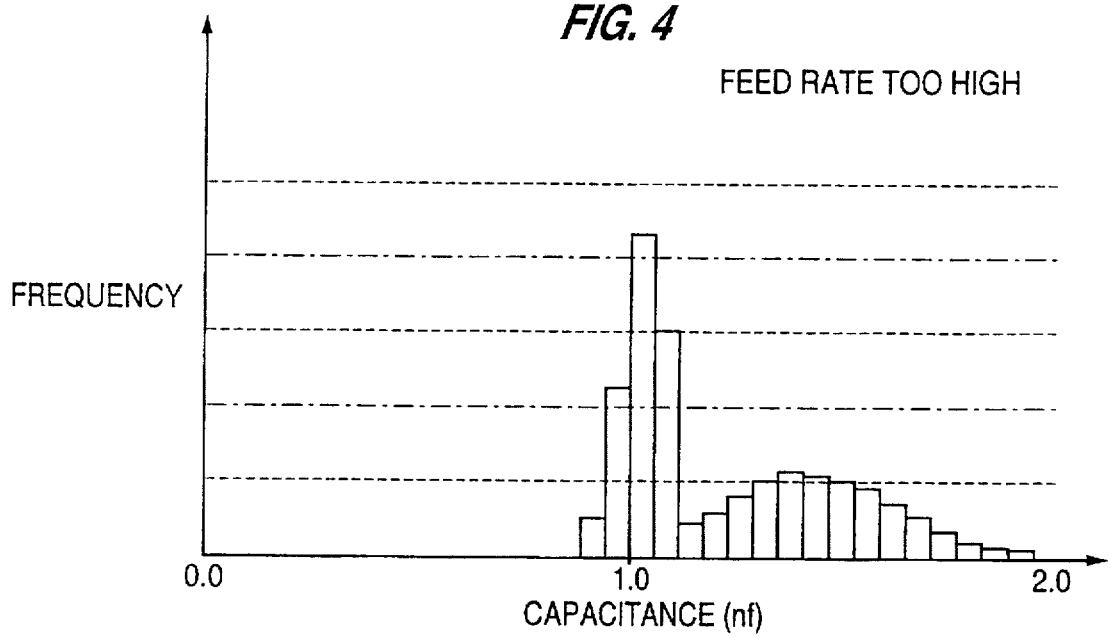

5,694,046

METHOD AND APPARATUS FOR MONITORING THERMAL PROCESSING OF A WORKPIECE IN ACCORDANCE WITH A MEASURED CAPACITANCE FREQUENCY DISTRIBUTION

BACKGROUND OF THE INVENTION

1. Field of the Invention

The invention relates to a method for thermal processing of a workpiece using a sensor electrode which can be positioned relative to the workpiece and to which an alternating electric signal is applied in order to determine a measured capacitance present between the sensor electrode and workpiece by evaluating a change in the alternating signal as a consequence of the measured capacitance.

2. Description of Related Art

In connection with laser welding processes, it has already been disclosed in EP 0344339 A1 and in the article by W. Gatzweiler et al. "Messung von Plasmadichtefluktuationen and Schallemission beim Laserstrahlshweißen zur Prozeß überwachung" ("Measurement of plasma density fluctuations and sound emissions during laserbeam welding for process monitoring"), Laser und Optoelektronik 20, 5, pages 64 to 69 (1988) to use photodetectors to measure the radiation emitted by the workpiece or the welding plasma and to reach conclusions on the process parameters and the process quality from mean intensity of the emitted radiation.

The article by L. Li et al. "Laser weld quality monitoring and fault diagnosis", Proceedings International Conference on "Laser systems application in industry" (Turin, Italy, November 1990) proposes to use an insulated nozzle electrode to measure electric charge distributions caused by the welding plasma and employ them for process diagnosis.

Furthermore, an article by A. Topkaya and E. Foldvari "Height sensor offers precise control of Nd:YAG laser cutting and welding", Industrial Laser Review, November 1993, pages 17 to 18 has already disclosed that, during laser welding, fluctuations occur in the capacitance, measured by a capacitive distance sensor system, between the sensor electrode and workpiece.

SUMMARY OF THE INVENTION

It is therefore an object of the present invention to develop a method of thermal processing in such a way that satisfactory monitoring of the thermal processing of the workpiece is possible without additional outlay on the apparatus.

These and other objects of the present invention are fulfilled by providing a method including the steps of measuring a capacitance frequency distribution formed from a number of determined measured capacitances and comparing the distribution with a reference distribution. The result of this comparison then directly indicates satisfactory thermal processing or defective thermal processing of the workpiece. In this case, the reference distribution can be prescribed in agreement with process parameters to be monitored.

If the above comparison leads, for example, to a deviation of the measured capacitance frequency distribution from the reference distribution, an error signal can be generated in order to interrupt the processing of the workpiece or to readjust or change process parameters. In this case, the reference distribution can also be updated by such measured capacitance frequency distributions for which no error signal is generated.

According to an advantageous embodiment of the present invention, a monitoring signal is generated from the characteristic of the measured capacitance frequency distribution, with the result that the monitoring signal can be compared with a reference signal generated from the reference distribution. In the event of deviation of the monitoring signal from the reference signal, the above-mentioned error signal can then be formed. A particularly simple provision of the monitoring signal can be performed by integrating the measured capacitance frequency distribution.

The measured capacitances are preferably determined at a fixed sampling rate for the purpose of forming a respective measured capacitance frequency distribution, for example at a constant sampling frequency of approximately 20 kHz. Depending on the process conditions, however, sampling frequencies are also possible which are above or below 20 kHz.

According to another embodiment of the present invention, the measured capacitance frequency distribution is formed only over a period which is short by comparison with the total time of the thermal processing of the workpiece, in order in this way to be able to learn, as early as possible, of the outcome concerning the quality of the workpiece processing.

Also according to the present invention, the monitoring signal can be generated only using a predetermined segment of the characteristic of the measured capacitance frequency distribution, this segment being outside the maximum of this distribution. If only this predetermined segment is taken into account, the monitoring signal can be generated substantially more quickly, with the result that a statement on the quality of the processing can be made even earlier. The position of the predetermined segment is selected in agreement with the process parameters to be monitored, as already indicated.

The thermal processing of the workpiece can be carried out, for example, by means of a laser beam, it being possible to use a laser processing nozzle for this purpose. However, the method according to the present invention is not restricted to the use of a laser beam for thermal processing of the workpiece.

These and other objects of the present invention will become more readily apparent from detail description given hereinafter. However, it should be understood that the detailed description and specific examples, will indicate the preferred embodiments of the present invention, are given by way of illustration, since various changes and modification within the spirit and scope of the invention will become apparent to those skilled in the art from this detailed description.

BRIEF DESCRIPTION OF THE DRAWINGS

The present invention will become more fully understood from the detailed description given herein below in the accompanying drawings which are given by way of illustration only, and thus are not limited to the present invention and wherein:

FIG. 3 shows a measured capacitance frequency distribution in the case of a satisfactory welding; FIG. 4 shows a measured capacitance frequency distribution in the case of welding in which the feed rate is too high.

DETAILED DESCRIPTION OF THE PREFERRED EMBODIMENT

Figure 1:
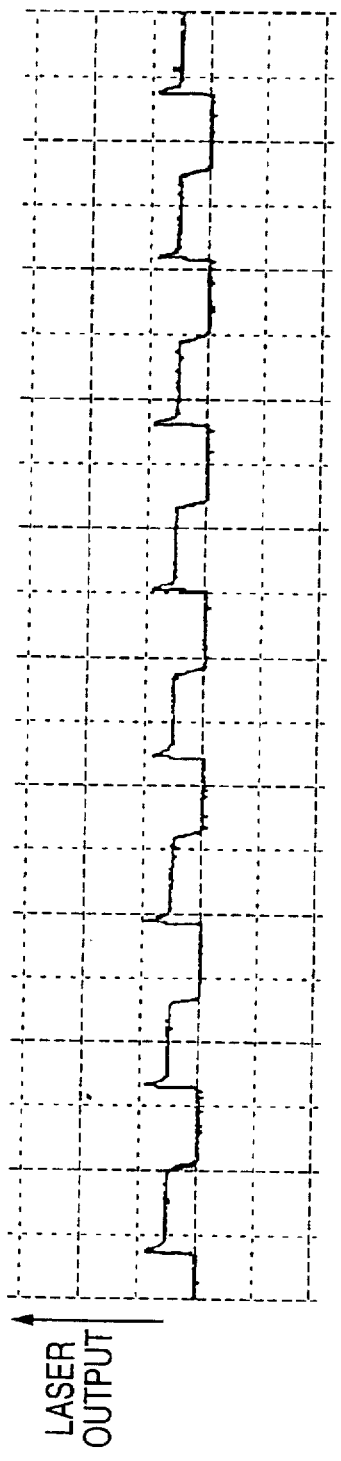
FIG. 1 shows the laser output emitted as a function of time in the case of a laser processing tool.
Figure 2:
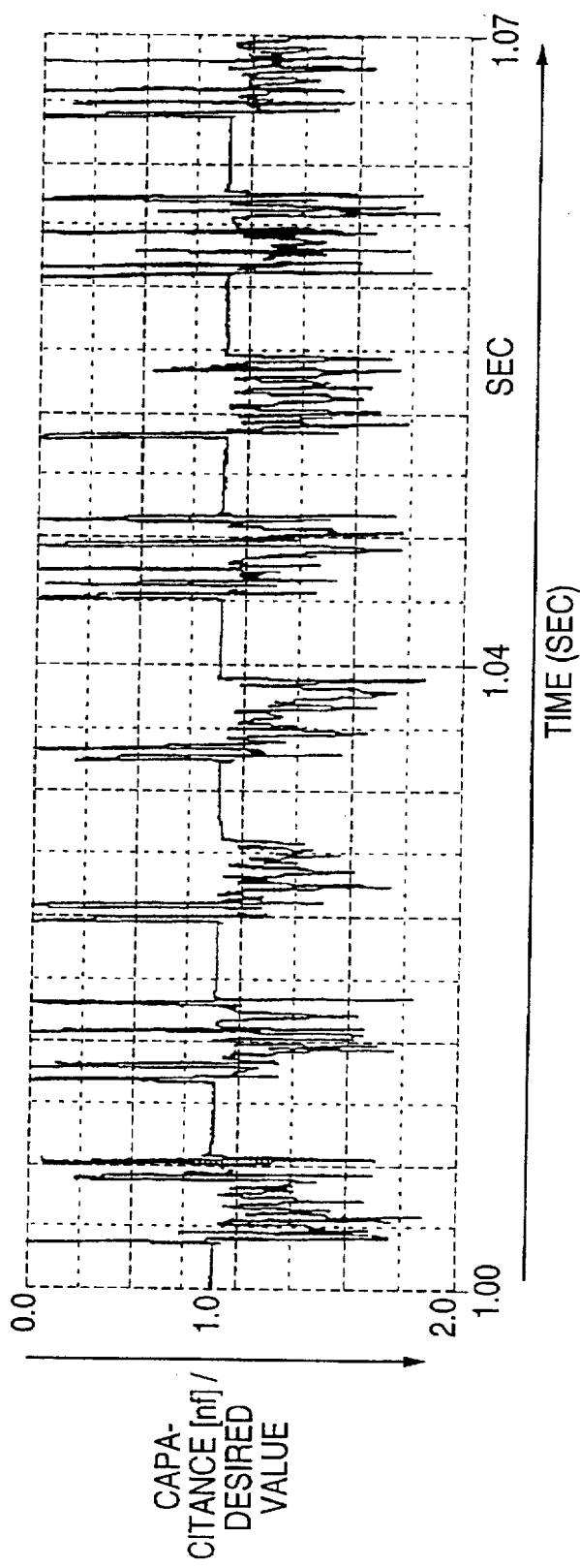
FIG. 2 shows the measured capacitance, measured in agreement with the diagram of FIG. 1, between the sensor electrode and the workpiece.

Laser radiation is emitted in the form of pulses shown in FIG. 1 by an Nd:YAG laser. This laser radiation is, for example, used to weld two steel plates. As can be seen in FIG. 2, in the interpulse periods, the capacitance signal is relatively constant. By contrast, during the laser pulses, the capacitance fluctuates considerably, specifically as a consequence of the changes in the dielectric constant because of the fluctuating plasma. On average, the plasma causes an increase in the dielectric constant, and, thus, in the measured capacitance, in comparison with a desired value indicated in FIG. 2. In the particular example shown in FIG. 2, the desired capacitance is one nanofarad. This desired value will clearly depend on the particular operating parameters of interest.

The changes, occurring as a consequence of the plasma in the case of thermal processing, in the measured capacitance $C_{meas}$ between a sensor electrode present at the tip of the laser processing tool and the workpiece are evaluated by sequentially recording the measured capacitance $C_{meas}$ during processing and calculating a frequency distribution therefrom. If the measured capacitance $C_{meas}$ is determined, for example, with a fixed sampling rate of 20 kHz, distribution curves which are typical with reference to the process parameters occur, as shown in FIGS. 3 to 6. In FIGS. 3 to 6, the scale of the capacitance is from 0.0 to 2.0 nanofarads. Each bin represented in FIGS. 3 to 6 has a width of roughly 0.06–0.07 nanofarads. Obviously, this width may be varied for a desired level of resolution and the capacitance scale will depend upon the particular operating parameters of interest. All particular numerical values recited herein are exemplary and are provided for completeness, but are not intended to be limitative.

FIG. 3 shows the measured capacitance frequency distribution in the case of lap-welding of steel plates using an Nd:YAG laser. Given the desired value of the capacitance in accordance with FIG. 2, the measured capacitance frequency distribution, as shown in FIG. 3, has a maximum. If, however, the feed rate of the laser processing tool is too high (for example, 1.5 m per minute instead of 1 m per minute), large capacitance fluctuations occur with a characteristically higher frequency (see FIG. 4) than in the case of the optimum feed rate in accordance with FIG. 3.

If, now, the measured capacitance frequency distribution in accordance with FIG. 4 is compared with a previously fixed and predetermined reference distribution which corresponds, for example, to the optimum measured capacitance frequency distribution shown in FIG. 3, it is possible to generate an error signal. This error signal, for example, may be used to readjust the feed rate to lower values until the measuring capacitance frequency distributions according to FIGS. 3 and 4 agree, at least for the domain of high capacitances. Instead of readjusting the feed rate, it is also possible to switch the laser of the entire processing device. Comparison of the two frequency distributions can also be restricted to respectively predetermined ranges which are outside the maximum of the distributions and are preferably in the range of relatively high capacitances.

Figure 5:
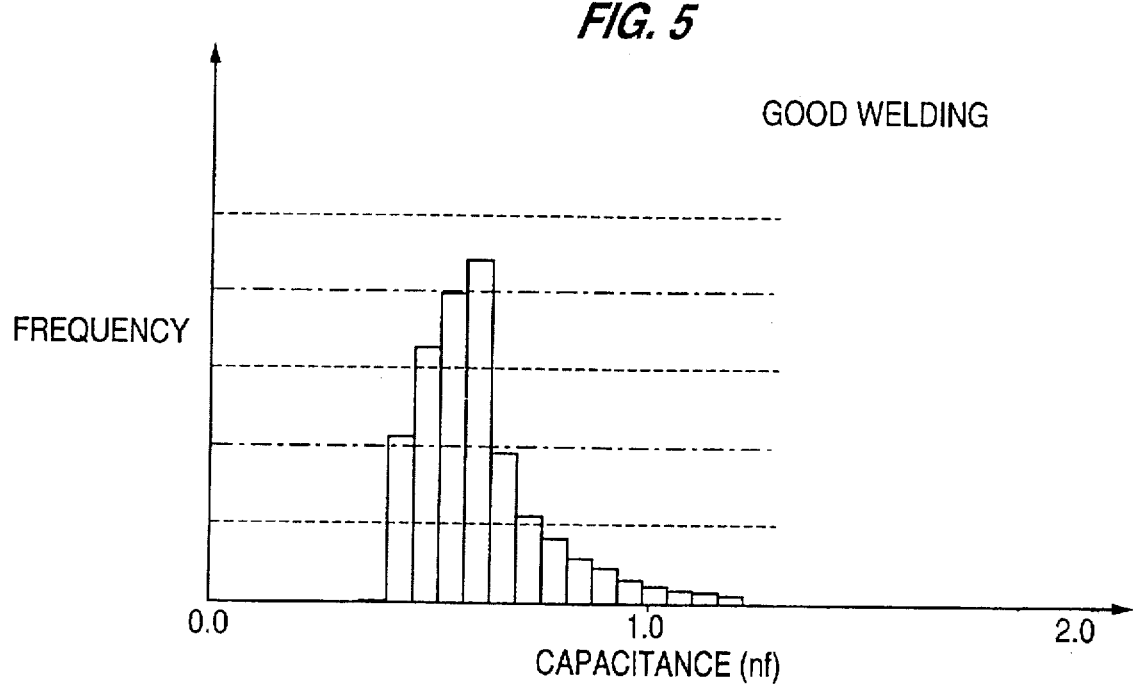
FIG. 5 shows a measured capacitance frequency distribution in the case of another instance of satisfactory welding.
Figure 6:
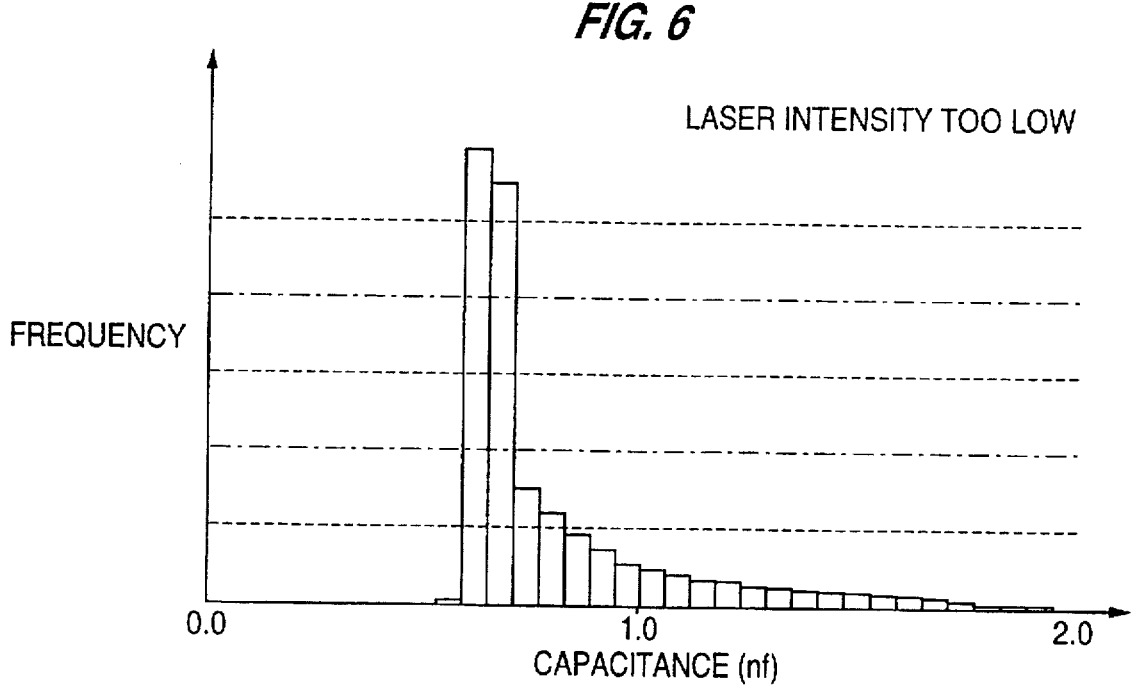
FIG. 6 shows a measured capacitance frequency distribution in the case of welding with excessively low laser intensity of the laser processing tool.

FIGS. 5 and 6 show the influence of an excessively low laser intensity during welding, something which leads to incomplete fusion. Here, as well, the characteristic curve of the measured capacitance frequency distribution permits a statement on the process quality. By comparing the frequency distributions shown in FIGS. 5 and 6, it is possible to generate an error signal. This error signal may then be used to readjust the laser intensity to higher values, specifically until the curve according to FIG. 6 corresponds to the reference curve according to FIG. 5. Of course, it is also possible here to shut down the installation at once on the basis of the error signal generated.

It is immediately evident with the aid of FIGS. 3 to 6 that the comparison of the respective measured capacitance frequency distributions with the respective reference distributions can be limited to the range of high capacitance values with the exclusion of the maximum of the respective distributions, with the result that the comparison results are available more quickly. It may be pointed out, moreover, that the recording of the measured capacitances must be carried out at least over the duration of the respective laser pulses, but can also, in addition, still be undertaken within the respective laser interpulse periods.

Figure 7:
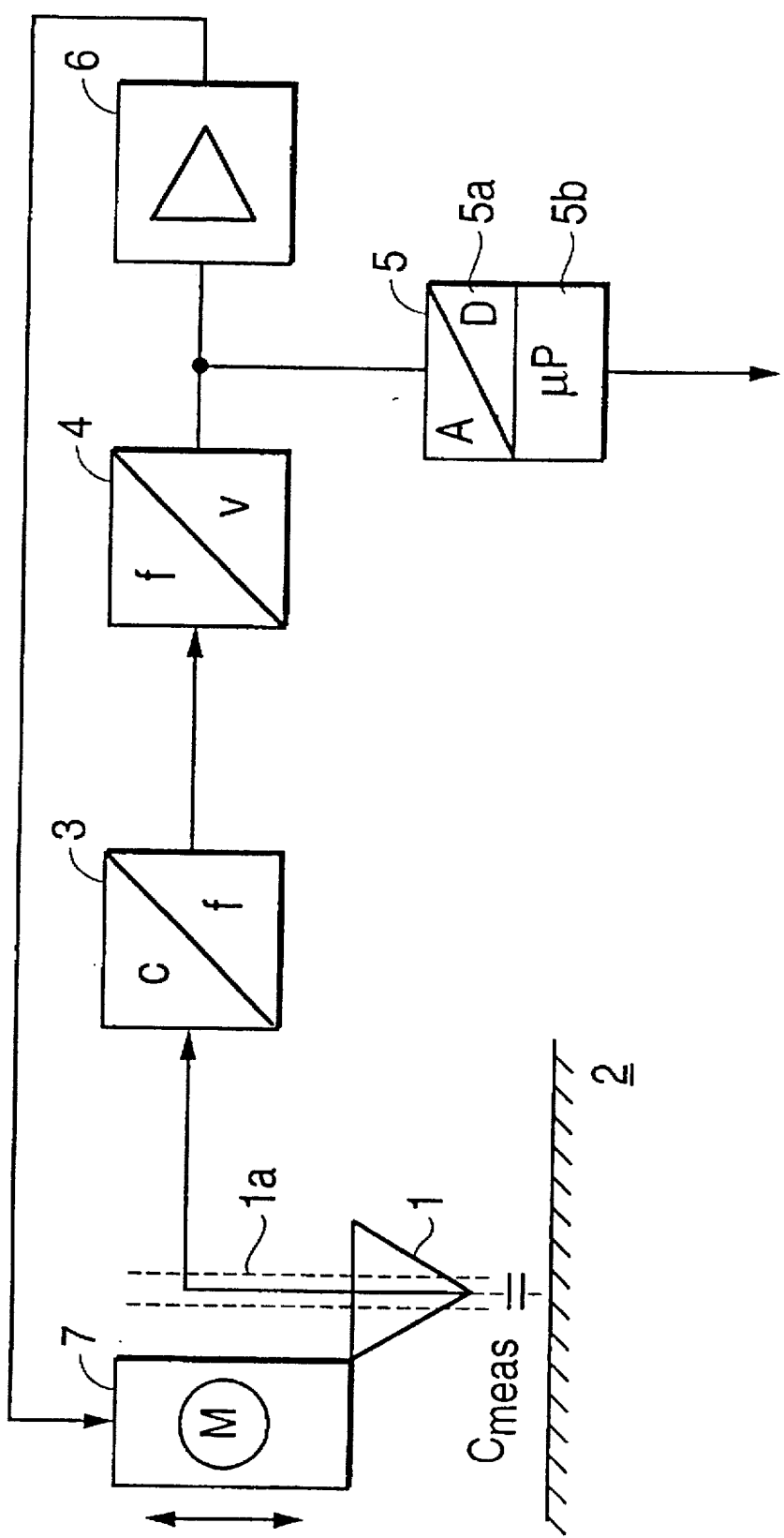
FIG. 7 shows a schematically represented block diagram of the structure of a laser processing tool with electronics connected.

FIG. 7 shows the schematic structure of a laser processing tool with electronics connected. The measured capacitance $C_{meas}$ between a sensor electrode 1, mounted on a processing nozzle (not represented), and a workpiece 2 is converted into a frequency by a capacitance/frequency converter 3. Such an arrangement is shown, for example, in U.S. Pat. No. 5,218,311 to Jagiella et al., which is hereby incorporated by reference.

For the purpose of thermal processing of the workpiece 2 of the present invention, a laser beam 1a emerges from the processing nozzle together with a process gas or, as an alternative to this, only a burning gas mixture emerges. The capacitance/frequency converter 3 can, for example, contain an LC oscillator whose frequency-determined capacitance at least partially comprises the measured capacitance $C_{meas}$. A frequency/voltage converter 4 connected downstream of the capacitance/frequency converter 3 generates a voltage signal which has an approximately linear relationship with the measuring capacitance $C_{meas}$. An evaluation unit 5, including an analog-to-digital converter 5a and a microprocessor 5b, is then used to form a frequency distribution of the measured capacitance values from this voltage signal.

In the configuration shown in FIG. 7, the evaluation unit 5 is connected to the output of the frequency/voltage converter 4. It is also possible to make direct use of a capacitance-voltage converter instead of the units 3 and 4.

It is advantageous that the voltage signal can also be employed for distance control of the processing nozzle using a control amplifier 6 and a motor-driven distance-adjusting device 7. The suppression of the voltage fluctuations conditioned by the plasma, which are undesirable for distance control, is performed by the inertia of the distance-adjusting device or by an additional low-pass filter.

For the purpose of forming the measured capacitance frequency distribution, the measured capacitances $C_{meas}$ are recorded by the analog-to-digital converter 5a whose sampling instants are controlled by the microprocessor 5b. It is expedient for the microprocessor 5b also to perform the calculation of the frequency distribution of the measured capacitance values, and to compare the measured frequency distribution with a frequency distribution which is typical of optimum process conditions, that is to say with the reference distribution. The deviation between two distributions, which can be determined, for example, by integrating the difference, serves as an error signal output by the evaluation unit 5. The error signal can then be used to control process parameters, for example to adjust the feed rate of the laser processing nozzle or to readjust the laser output. If this error signal overshoots a specific limiting value, a further error signal can be generated as a result. This further error signal can then be used to turn off or shut down the installation.

The time intervals for which the respective frequency distribution of the measured capacitance values is calculated, are between approximately 100 ms and 10 s, depending on whether the aim is a high spatial resolution of the process monitoring or low statistical fluctuations.

As already mentioned, the reference distribution which is generally prescribed, can be fitted and corrected as the process runs, also for example forming sliding averages using frequency distributions for which no error signal has been generated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for monitoring thermal processing of a workpiece comprising the steps of:

positioning a sensor electrode relative to the workpiece;

applying an alternating electric signal to said sensor electrode;

determining a measured capacitance ($C_{meas}$) present between the sensor electrode and the workpiece by evaluating a change in the alternating electric signal as a consequence of the measured capacitance ($C_{meas}$);

forming a measured capacitance frequency distribution from a number of measured capacitances ($C_{meas}$) from said determining step, said measured capacitance frequency distribution representing incidence of magnitude of said number of measured capacitances; and comparing said measured capacitance frequency distribution with a reference distribution, thereby monitoring said thermal processing.

2. The method according to claim 1, further comprising generating an error signal when said measured capacitance frequency distribution deviates from said reference distribution.

3. The method according to claim 1, further comprising:

generating a monitoring signal from a characteristic of the measured capacitance frequency distribution;

comparing said monitoring signal with a reference signal generated from the reference distribution; and generating an error signal when said monitoring signal deviates from said reference signal.

4. The method according to claim 1, wherein said determining step comprises determining said measured capacitances ($C_{meas}$) at a fixed sampling rate for the purpose of forming a respective measured capacitance frequency distribution.

5. The method according to claim 1, wherein said forming step comprises forming said measured capacitance frequency distribution over a period which is short by comparison with the total time of the thermal processing of the workpiece.

6. The method according to claim 3, wherein said generating step comprises generating said monitoring signal using a predetermined segment of said characteristic of said measured capacitance frequency distribution which is outside the maximum of said measured capacitance frequency distribution.

7. The method according to claim 3, wherein said generating step comprises generating said monitoring signal by integrating said measured capacitance frequency distribution over a prescribed range.

8. The method according to claim 2, wherein said generating step comprises generating said error signal once said measured capacitance frequency distribution is outside a prescribed range around said reference distribution.

9. The method according to claim 8, further comprising correcting said reference distribution by measured capacitance frequency distributions for which no error signal is generated.

10. The method according to claim 1, wherein said reference distribution can be prescribed in agreement with a process parameter to be monitored.

11. The method according to claim 1, wherein the thermal processing of the workpiece is carried out by means of a laser beam.

12. The method according to claim 2, further comprising altering process parameters of the thermal processing in response to said error signal.

13. The method according to claim 12, further comprising altering process parameters of the thermal processing in response to said error signal.

14. The method according to claim 12, wherein said altering comprises stopping the thermal processing.

15. The method according to claim 13, wherein said altering comprises stopping the thermal processing.

16. The method according to claim 1, further comprising, when said comparing step indicates said measured capacitance frequency distribution includes larger capacitance fluctuations above a peak occurring capacitance than said reference distribution, lowering a feed rate of the thermal processing.

17. The method according to claim 1, further comprising, when said comparing step indicates a maximum of said measured capacitance frequency distribution drops more quickly than a maximum of said reference distribution, increasing an intensity of a thermal processing signal.

18. An apparatus for monitoring thermal processing of a workpiece comprising:

a sensor electrode positioned relative to the workpiece;

means for applying an alternating electric signal to said sensor electrode;

a detector which measures a measured capacitance between said sensor electrode and the workpiece by evaluating a change in said alternating electric signal as a consequence of said measured capacitance;

means for forming a measured capacitance frequency distribution from a number of measured capacitances output from said detector, said measured capacitance frequency distribution representing incidence of magnitude of the number of measured capacitances; and means for comparing said measured capacitance frequency distribution with a reference distribution, thereby maintaining said thermal processing.

19. The apparatus according to claim 18, further comprising means for generating an error signal when said measured capacitance frequency distribution deviates from said reference distribution.

20. The apparatus according to claim 19, further comprising means for adjusting process parameters of the thermal processing in accordance with said error signal.

* * * * *